March 18, 1969  W. S. HEATH ET AL  3,434,077
TEM MODE FARADAY ROTATOR
Filed Feb. 10, 1967

WALTER S. HEATH
LELAND R. MEGARGEL
INVENTORS

BY *Stanley M. Schinger*
ATTORNEY

March 18, 1969     W. S. HEATH ET AL     3,434,077
TEM MODE FARADAY ROTATOR

WALTER S. HEATH
LELAND R. MEGARGEL
INVENTORS 3,434,077
TEM MODE FARADAY ROTATOR
Walter S. Heath, Grand Rapids, Mich., and Leland R. Megargel, Buffalo, N.Y., assignors to Sylvania Electric Products Inc., a corporation of Delaware
Filed Feb. 10, 1967, Ser. No. 615,112
U.S. Cl. 333—24.1                                 4 Claims
Int. Cl. H03h 5/00; H01p 5/12

ABSTRACT OF THE DISCLOSURE

A microwave Faraday rotator of TEM mode construction and having a ferrimagnetic rod with four conductive wires symmetrically disposed on the rod to form two pairs of orthogonally related balanced transmission lines, and a solenoid disposed around the rod to produce a longitudinal magnetic field in the rod. A linearly polarized wave generated by energization of one transmission line pair is rotated by an amount determined by the magnitude and sense of the magnetic field, with the output being obtained via the relative magnitude of the signals appearing at the output end of each transmission line pair. A circularly polarized wave is generated by energizing all four wires with signals in the phase relation 0°, 90°, 180° and 270°, with the output, taken at the output end of the four wires, being phase shifted by an amount goverened by the sense and strength of the magnetic field.

Background of the invention

This invention relates generally to Faraday rotation devices and, more particularly, to a ferrimagnetic loaded Faraday rotator in which microwave energy is propagated in the transverse electromagnetic (TEM) mode.

Faraday rotators have found wide application in a variety of microwave circuit devices, such as isolators, phase shifters, switches, modulators and duplexers. The devices are based upon the Faraday effect which describes the rotation of the plane of polarization of an electromagnetic wave propagating through a ferrimagnetic medium. The rotation in an infinite ferrimagnetic medium is theoretically dependent upon the path length through the medium, the dielectric constant, the permeability, and the magnetization of the medium.

Conventionally, the Faraday rotator consists of a square or circular waveguide having a long slender ferrite or garnet rod positioned along the axis of the guide. A solenoid produces a longitudinal magnetic field. If a linearly polarized electromagnetic wave is launched at one end of the waveguide, the direction in which the plane of polarization of the wave is turned depends upon the direction (sense) of the control field and the direction in which the wave is propagated. The amount of Faraday rotation obtainable per unit length of the rod is dependent upon the magnetization produced in the ferrite, the amount of ferrite present and the energy distribution inside the ferrite loaded guide. This magnetization depends upon the applied field strength, the ferrite composition, and the ferrite geometry. The energy distribution is dependent upon the ferrite and guide geometries, the dielectric constant of the ferrite and the medium surrounding it, the percentage of the guide cross section occupied by the ferrite, and the frequency of the electromagnetic wave energy.

Among the principal design objects, it is desired to provide a ferrite rotator which exhibits low loss characteristics and provides relatively constant rotation over the operating bandwidth. In the case of guided wave propagation, however, it has been found experimentally that rotation increases with frequency. A number of methods have been used to offset this disadvantage, such as using a rod whose rotation increases with frequency in combination with a rod whose rotation decreases with frequency; such an approach, however, has a disadvantage of higher loss, since an additional ferrite rod is required, necessitating the use of larger magnets. Subsequently, it was found that rotation could be made constant by lowering the cutoff frequency of the waveguide in relation to the operating frequency. In pursuit of this objective, other waveguide configurations have been employed including: filling a circular waveguide entirely with the ferrite medium; using ridged circular waveguide with or without dielectric loading; or, loading a circular waveguide circumferentially with the ferrite.

In all of the above-described devices, the electromagnetic fields propagate in hybrid modes, that is, combinations of TE and TM modes. Each of the modes has a low frequency cutoff, and each device is capable of propagating an infinite number of modes. The cross-sectional dimensions of all guides are related to the operating frequency such that these dimensions increase as the frequency decreases. As a consequence, these devices become large and heavy in lower microwave frequency applications. In addition, extremely close machining tolerances must be held in order to provide satisfactory electrical performance.

The aforementioned disadvantages have been found to be intolerable for many present applications, particularly communication satellites and other applications where efficiency, compactness and light weight are critical.

Summary of the invention

Briefly, a Faraday rotator according to the invention comprises a ferrimagnetic rod, four conductive wires dispossed symmetically about the rod to provide a pair of two-wire balanced transmission lines oriented orthogonally to one another, and means for producing a longitudinal magnetic field within the rod. The device provides Faraday rotation of a lineraly polarized wave or phase shift of a circularly polarized wave. The ferrimagnetic rod and conductors constitute a transverse electromagnetic mode (TEM) structure. If a microwave signal is applied to one pair of conductors so that the currents flowing therethrough are respectively 180° out of phase, a linearly polarized TEM mode wave is launched into the structure, and the plane of polarization of the wave propagating therethrough is rotated in response to the magnitude and direction of the static magnetic field applied along the axis of the rod. The output signal is taken from the output end of the two transmission line pairs, the relative magntiude of the signals appearing at each pair varying according to the degree of wave rotation. A wave rotation of 90° causes an output signal to appear only on the pair of wires orthogonal to the energized pair, thereby providing switching action.

In the phase shifter application, a circularly polarized wave of the TEM mode is launched into the structure by applying the input microwave signal to the four wires with clockwise or counterclockwise respective phase relationships of 0°, 90°, 180°, and 270°. The phase shifted output signal is then obtained by coupling to all four wires. A reflection type Faraday rotator or phase shifter may be obtained by providing a short or open circuit of the transmission lines at the end of the rod opposite that at which the wave is launched.

Since this Faraday rotation device uses a TEM structure with no circular or rectangular waveguide, there is now low frequency cutoff, other than the low field cutoff frequency of the ferrimagnetic material itself, and machining tolerances are, therefore, relatively uncritical. In this device, the radio frequency (RF) magnetic field and the applied static field are always perpendicular, thereby providing an increased rotation per unit length; in addition, the more efficient use of the ferrimagnetic material in the TEM mode also enhances the phase shift achieved per unit volume. Consequently, a shorter device is required to attain the specified amount of rotation thereby yielding lower insertion loss and reduced weight and volume.

*Brief description of the drawings*

The invention will be more fully described hereinafter in conjunction with the accompanying drawings, in which.

*Detailed description of the invention*

Figure 1:
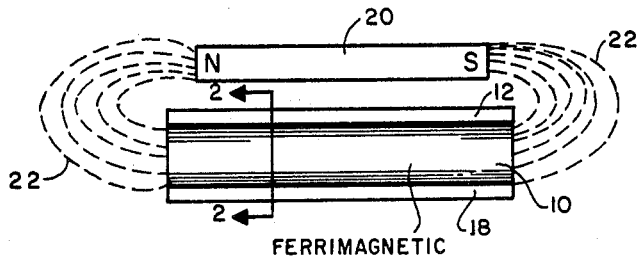
FIG. 1 is a diagrammatic plan view of a Faraday rotator in accordance with the invention.
Figure 2:
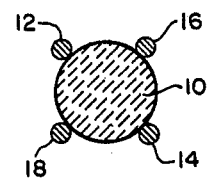
FIG. 2 is a cross-sectional view taken along line 2—2 of FIG. 1 which illustrates the symmetrical arrangement of conductors about a ferrimagnetic rod in accordance with the invention.
Figure 3:
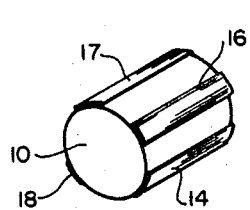
FIG. 3 is a perspective view of a ferrimagnetic rod having flat conductive strips plated thereon in accordance with an alternate embodiment of the invention.
Figure 4:
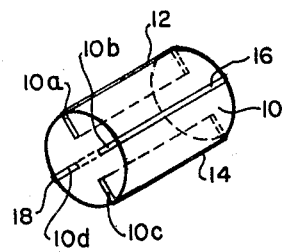
FIG. 4 is a perspective view of a ferrimagnetic rod having slots in which conductors are retained in accordance with another alternate embodiment of the invention.

Referring to FIGS. 1 and 2, the Faraday rotator is shown as comprising a ferrimagnetic rod 10 with four conducting wires placed symmetrically about it to form two pairs of diametrically opposed conductors 12, 14 and 16, 18. The rotator also includes means for producing a longitudinal magnetic field within the rod 10, which in this case is diagrammatically illustrated by a permanent magnet 20 arranged to axially apply a static magnetic field (represented by lines 22) to the rod. The cross-section of rod 10 may be circular, as shown, or of any other shape which has a symmetry whereby the spacing between the pair of conductors 12, 14 is equal to that between the pair of coductors 16, 18. The four conducting wires are positioned longitudinally on the rod and in contact with the ferrimagnetic material throughout its length, and conductor pair 12, 14 is oriented orthogonally with respect to conductor pair 16, 18. The conducting wires 12–18 may be of circular cross-section as shown in FIG. 2, or may comprise flat strips plated on the ferrimagnetic rod by electrodeposition, as inllustrated in FIG. 3. Alternately, as shown in FIG. 4, rod 10 may have four longitudinal slots 10a, 10b, 10c and 10d, and conductors of the rectangular cross-section may be retained in those slots by use of cement or shrink tubing.

When used as described hereinafter, rod 10 and conductors 12–18 constitute a transverse electromagnetic mode (TEM) structure comprising a pair of two-wire transmission lines located at right angles to each other, with no circular or rectangular waveguide structure being required. In essence, each of the conductor pairs 12, 14 and 16, 18 constitutes a two-wire balanced transmission line with the input electromagnetic wave energy being applied to at least one of the conductor pairs and the resulting output electromagnetic wave energy being obtained from at least the other conductor pair. Application of the longitudinal magnetic field to rod 10 causes the polarization of the applied electromagnetic wave to rotate according to the magnitude and sign of the static field. In this manner, as will now be described in detail, the device can be used to provide Faraday rotation of a linearly polarized wave or phase shift of a circularly polarized wave in microwave applications where such functions are required.

Figure 5:
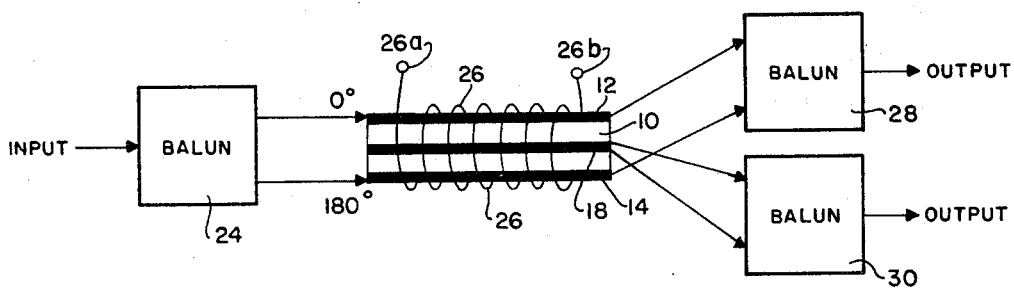
FIG. 5 is a schematic diagram of a microwave switch with input and output coupling means in accordance with the invention.

Referring to FIG. 5, the above-described TEM structure is shown with input and output coupling circuits arranged to provide a switching function. A balun 24 is used to couple the unbalanced input line to the balanced two-wire transmission line comprising conductors 12 and 14. In this manner, the input electromagnetic wave energy is applied to the transmission line so that the currents thereby caused to flow through conductors 12 and 14 are respectively 180° out of phase. Such application of input energy is operative ot launch a linearly polarized wave of the TEM mode into the transmission line structure. It is the plane of polarization of this wave propagating through the TEM structure which is rotated in response to the magnitude and direction of a longitudinal magnetic field applied to the rod 10. In this instance, the static magnetic field applied along the axis of the rod is produced by a solenoid winding 26 disposed concentrically about the rod and adapted to be electrically energized through terminals 26a and 26b. If solenoid 26 is not energized, so that the longitudinal magnetic field strength is essentially zero, the output wave is obtainable from the same transmission line to which the input energy was applied, since no rotation occurs; consequently, a balun 28 is coupled to the output end of conductors 12 and 14 to provide one output state of the switch. If solenoid 26 is energized to produce a longitudinal magnetic field strength of sufficient mangnitude to cause a 90° rotation of the plane of polarization of the wave propagating through the TEM structure, the output wave will be obtainable from the orthogonal transmission line; balun 30 is coupled to the output end of transmission lines 16 and 18 to provide this output state of the switch.

Figure 6:
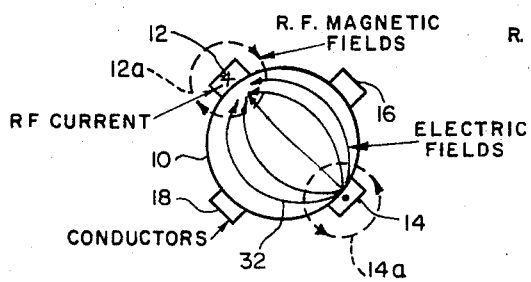
FIGS. 6–8 are cross-sectional diagrammatic views taken at the output of the rotator and illustrating the rotation of a wave with increasing static magnetic field strength.
Figure 7:
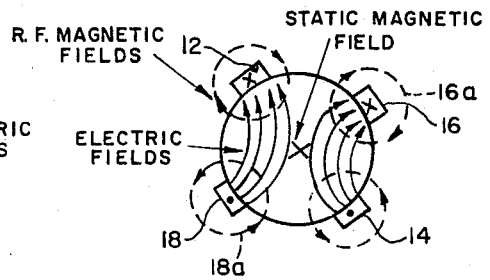
Figure 8:
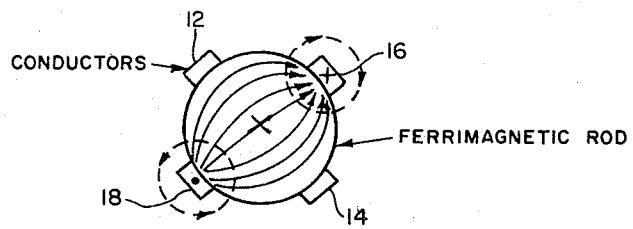

The operation of the basic Faraday rotation switch shown in FIG. 5 will be clarified by referring to FIGS. 6–8, which illustrate the successive change in location and direction of the magnetic and electric fields and currents in the TEM structure as the longitudinal magnetic field strength is increased. The cross-sectional view of the rod and conductors shown in FIG. 6 shows the condition of the fields and currents at a given instant of time in the absence of a longitudinal magnetic field. As in any two-wire line, currents flow along the conductors in opposite directions, and the electric fields originating on one conductor, extend through the ferrimagnetic rod and terminate in the conductor on the opposite side. For the instant illustrated by FIG. 6. the X on conductor 12 indicates an RF current flowing into the plane of the drawing and the dot on conductor 14 represents an RF current flowing out of the plane of the drawing; consequently, the electric fields, indicated by arrows 32, start on conductor 14 and terminate in conductor 12. Of particular importance to the present invention is the fact that the currents flowing through conducting wires 12 and 14 also produce circular RF magnetic fields about the wires, indicated by the dashed line arrows 12a and 14a respectively, the magnetic paths of which pass through the ferrimagnetic material. This orientation of the RF magnetic fields assures that the RF magnetic field and the longitudinally applied static magnetic field are always perpendicular, an arrangement essential for optimum electromagnetic interaction with the ferrimagnetic material and providing the increased amount of rotation per unit length experienced in this device. In contrast, the RF magnetic fields in the conventional circular and rectangular waveguide type Faraday rotators are not always perpendicular to the static magnetic field, since they support a multimode propagation; consequently, these prior art devices are relatively inefficient and provide much less rotation than the described TEM mode Faraday rotator.

The application of a longitudinal magnetic field causes energy propagating on one two wire line to be rotated into or coupled into the orthogonal line, as shown in FIG. 7. The high permittivity of the ferrimagnetic material effectively confines the RF fields within the rod with very little leakage. The instantaneous condition of the fields and currents shown in FIG. 7 is that for an intermediate value of magnetic field strength of direction or sense into the plane of the drawing as indicated by the X in the center of rod 10. Due to the rotation of the plane of polarization of the wave propagating through the TEM structure, the 180° phase displaced currents flow through both of the orthogonal two-wire transmission lines, with the electric field emanating from conductor 18 terminating in conductor 12, and the electric field starting on conductor 14 extending to conductor 16. In this case, circular magnetic fields are also produced about conductors 16 and 18, as indicated by the dashed line arrows 16a and 18a, respectively.

FIG. 8 shows an instantaneous condition of the fields and currents for a full 90° rotation of the plane of polarization of the wave propagating through the rod pursuant to a further increase in the longitudinal magnetic field. In this case, the balanced line currents are flowing though conductors 16 and 18 only, with the electric fields radiating from the conductor 18 and terminating in conductor 16. Hence, FIGS. 6 and 8 represent the two states of the Faraday rotator switch. With no static magnetic field as in FIG. 6, the electromagnetic wave appears at the output of balun 28, and with the magnetic field of FIG. 8 applied, the electromagnetic wave is switched to appear at the output of balun 30.

The TEM mode Faraday rotator structure may also be applied as a phase shifter by launching a circularly polarized wave into the structure. This is accomplished by applying input RF energy to the four conductors 12-18 so as to cause currents flowing therethrough which have respective phase relationships of 0°, 90°, 180° and 270°. This method of launching the microwave energy may be accomplished in a number of different ways, one of which is to employ a combination of coaxial baluns to produce the desired match into the TEM mode structure. Another input coupling circuit approach is that shown in FIG. 9 in which the input microwave energy is applied through a 90° phase shifter circuit and a pair of hybrid rings to provide inputs to the conducting wires having the proper phase relationships. The input energy enters the phase shifter circuit at port 34a of a 3 db quadrature hybrid 34. Half of the incident power appears at port 34b at a phase which can be arbitrarily used as a reference, or zero degrees. The remaining half of the incident power appears at port 34c with a phase of —90°. Ports 34b and 34c respectively feed hybrid rings 36 and 38, each of which splits the power incident on it into two equal parts which are 180° different in phase. More particularly, the zero degree power at port 34b is coupled to port 36a of hybrid ring 36. The ring has three other ports: 36b, which is spaced one-quarter wave length from port 36a; port 36c, which is connected to a dummy load and spaced one-quarter wave length from port 36b; and, port 36d which is spaced one-quarter wave length from port 36c and three-quarters of a wave length from port 36a. The power output at port 36b has a phase of —90° and is applied to conductor 12 of the Faraday rotator structure, and the output of port 36d which has a phase of —270° is applied to conductor 14. Hybrid ring 38 has four ports 38a, b, c, and d which have a spacing identical to that for ring 36. The —90° output of port 34c is coupled to port 38a of this hybrid ring, and the —180° and —360° outputs of ports 38b and d are applied respectively to conductors 18 and 16. Hence, progressing circumferentially around rod 10 in a counterclockwise direction, one sees in sequence conductors 12, 18, 14 and 16, the RF current phases in each of which are respectively —90°, —180°, —270° and —360°. This phase and amplitude distribution produces a circularly polarized wave on the four wire TEM structure of the rod.

If a reflection type phase shifter is desired, all four conductors are either open or short circuited, or an impedance mismatch otherwise provided, at the end of the rod opposite the end at which the circularly polarized wave is launched. In this event, energy is reflected with the opposite rotational sense of circular polarization. Hence, a wave which is shifted $\theta$ degrees in travelling from the input to the short, will undergo a total shift of $2\theta$ when the reflected wave returns to the input; e.g., if the wave launched at the input is right circular polarized and travels with the static magnetic field (i.e., the longitudinal magnetic field has a positive sense), the phase shift by the time the wave reaches the short will be $+\theta$; the reflected wave will be left circular polarized, but since it travels against the longitudinal magnetic field, therefore having a relative sense that is negative, the phase shift will again be $+\theta$; the two positive phase shifts therefore, add together to provide a total phase shift of $2\theta$. This reflected energy is recombined in the hybrid rings and the quadrature hybrid, and because of the phase reversal at the short (or open) circuit, the recombined reflection appears at port 34d of the quadrature hybrid 34 (as indicated in FIG. 9).

Figure 9:
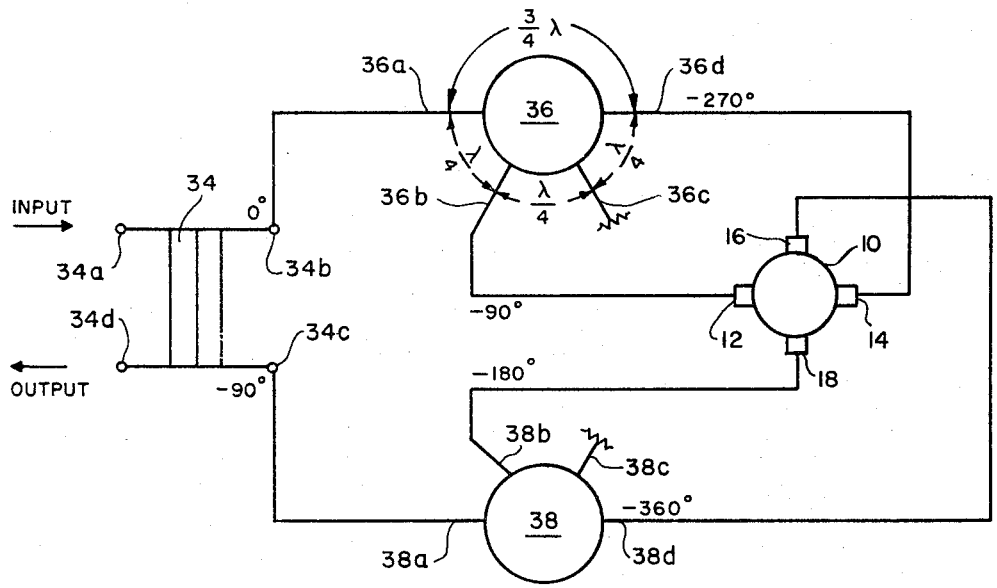
FIG. 9 is a schematic diagram of input and output coupling means suitable for operating the Faraday rotator of the invention in a reflection type phase shifter; and, FIG. 10 is a cross-sectional plan view of a preferred embodiment of the Faraday rotator in accordance with the invention.

For non-reflective phase shifter applications, port 34d is connected to a dummy load so that the circuit of FIG. 9 functions solely as an input coupling circuit. The phase shifted output is obtained by connecting an output coupling circuit at the ends of conductors 12, 18, 14 and 16 opposite the ends at which the circularly polarized wave is launched. This output circuit may be identical to the input circuit, with port 34a being the output terminal.

The above-described Faraday rotator switch (FIG. 5) may also be implemented as a reflection type device. In the case of the switch, however, one is dealing with the amount of rotation of a linearly polarized wave rather than the amount of phase shift of a circularly polarized wave. A linearly polarized wave which is rotated $\theta$ in going from left to right, if reflected, will undergo a total rotation of $2\theta$ when it returns to the input. This result is due to the nonreciprocal nature of the device. For example, if a linearly polarized wave were launched from the left hand end of the Faraday rotator shown in FIG. 1, the wave would be turned clockwise when viewed from the left hand end of the rod, and if a linearly polarized wave were launched from the right hand side of the Faraday rotator, thereby traveling against the longitudinal magnetic field, the wave will be turned counterclockwise when viewed from the right hand end at which it was launched. It will be noted, however, that if the wave launched from the right hand side were viewed from the left hand end, it would appear to be turned clockwise. Hence, in the reflection type device, the rotation of the wave reflected back to the input will add to the rotation imparted to the incident wave.

Figure 10:
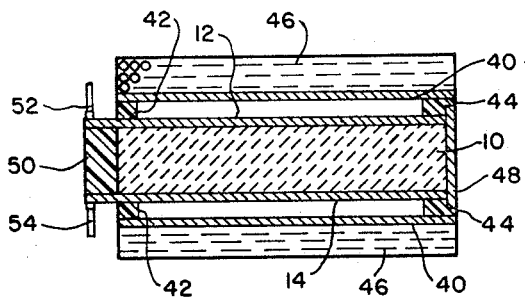

A preferred embodiment of a reflection type Faraday rotator, suitable for application as either a phase shifter or switch, is shown in FIG. 10. The unit comprises a circular garnet rod 10 upon which is deposited four equally spaced parallel longitudinal conducting strips, only strips 12 and 14 being visible in the figure. To reduce any stray radiation to an insignificant level, rod 10 is surrounded by a very thin tubular conducting shield 40 which is coaxially supported at a selected radial distance from the rod by means of dielectric rings 42 and 44 disposed at each end of rod 10. Shield 40 also serves to support a solenoid winding 46 about the rod 10. The transmission line impedance mismatch in this instance is a short circuit comprising a conducting plate 48 soldered or otherwise electrically connected to all four conducting strips at one end of the rod. At the input end of the rod, the four conducting strips extend over a dielectric cylindrical extension 50 to provide terminals at which the input microwave energy can be applied through conductors soldered thereto, such as conductors 52 and 54 connected respectively to strips 12 and 14. The rotator of FIG. 10 may be used in combination with the input-output circuit of FIG. 9 to provide a reflection type phase shifter by connecting ports 36b and 36d (FIG. 9) to terminals 52 and 54, respectively, and connecting ports 38b and 38d (FIG. 9) to the terminals of the pair of conductors not shown in FIG. 10. When used as a reflection type Faraday rotator switch, the input energy is applied to conducting strips 12 and 14 via terminals 52 and 54, respectively, in the same manner as described with reference to FIG. 5, and the output energy is removed at the same end of the rotator from the terminals of the pair of conductors not shown in FIG. 10.

Unlike a ferrimagnetic loaded waveguide, the TEM device has no cutoff frequency imposed by dimensions, and consequently the restrictions on diameter, weight and volume are considerably relaxed. The only frequency sensitive element in the TEM device is the ferrimagnetic rod itself. Selection of the best ferrimagnetic material for the application is dependent on a number of different parameters. When not magnetized or weakly magnetized, microwave ferrites and garnets in general exhibit low magnetic losses at audio and low radio frequencies. These losses become high in the VHF and UHF range and then drop to low levels again in the microwave region. The microwave frequency at which the losses become low is called the low field cutoff frequency. Ferrites and garnets having large magnetic saturation moments have higher low field cutoff frequencies. The low field cutoff frequency for a particular material is temperature dependent and tends to increase as the temperature decreases. The magnetic saturation moment, on the other hand, must be high because this yields the most rotation for a given amount of magnetic field. Consequently, the optimum choice for a given application would be those ferrimagnetic materials having the highest saturation moment consistent with calculated low field cutoff frequencies lower than the lowest required operating frequency for the application.

It is apparent from the above description that the present invention provides a means for producing Faraday rotation with significantly improved electrical efficiency in that the device provides a greater amount of rotation per unit length than heretofore obtainable. As a consequence, a shorter device is required to perform a specified amount of rotation. Since the length of the device is reduced, the insertion loss is less than that for previously known Faraday rotators. With a shorter length and smaller cross-sectional area, the weight is reduced considerably, and since the electromagnetic wave is of the TEM mode, machining tolerances are relaxed.

While particular embodiments of this invention have been illustrated, it is to be understood that the invention is not to be limited thereto since modifications will occur to those skilled in the art. For example, in lieu of generating a direct current axial field, a low frequency periodic waveform may be applied to produce the field to provide a modulated rotation or phase shift effect; also as pointed out in the above description, the shape of the rod 10, the shape of the conducting wires 12–18 and their method of mounting to the rod, and the input and output coupling circuitry may be embodied according to several known and satisfactory variations. Accordingly, the invention is not to be limited except in accordance with the appended claims.

What is claimed is:

1. A Faraday rotator comprising a ferrimagnetic rod, first, second, third and fourth conductors disposed symmetrically about said rod to form first and second pairs of diametrically opposed conductors positioned longitudinally with respect to said rod and orthoganally with respect to each other, the spacing between each of said pairs of conductors being equal and each conductor pair constituting a two-wire balanced transmission line, said rod and conductors thereby constituting a transverse electromagnetic mode structure, means for producing a longitudinal magnetic field within said rod, means for coupling input electromagnetic wave energy to said four conductors so that it is applied with respective phase relationships of 0°, 90°, 180° and 270°, such application of energy being operative to launch a circularly polarized wave of the transverse electromagnetic mode into said structure and the phase of the wave propagating through said structure being shifted in response to the magnitude and direction of said longitudinal magnetic field, and means for coupling output energy from said four conductors.

2. A rotator in accordance with claim 1 wherein said means for coupling input energy to said conductors comprises: means for splitting incident power into two equal parts displaced 90° in phase, said 90° phase splitting means having a power input means, a first power output means from which energy at a reference phase is obtained, and a second power output means from which energy displaced 90° from said reference phase is obtained; a first means for splitting incident power into two equal parts displaced 180° in phase, said first 180° phase splitting means having a power input means coupled to the first power output of said 90° phase spliting means, a first power output means coupled to said second conductor and from which energy displaced 90° from said reference phase is obtained, and a second power output means coupled to said fourth conductor and from which energy displaced 270° from said reference phase is obtained; a second means for splitting incident power into two equal parts displaced 180° in phase, said second 180° phase splitting means having a power input means coupled to the second power output of said 90° phase splitting means, a first power output means coupled to said first conductor and from which energy displaced 0° from said reference phase is obtained, and a second power output means coupled to said third conductor and form which energy displaced 180° from said reference phase is obtained.

3. A rotator in accordance with claim 2 wherein said 90° phase splitting means is a 3 db quadrature hybrid and said first and second 180° phase spliting means are a pair of hybrid rings.

4. A rotator in accordance with claim 3 wherein an impedance mismatch is provided at the end of said structure opposite the end at which the circularly polarized wave is launched, thereby providing a reflection type phase shifter, and said means for coupling output energy from said four conductors includes said pair of hybrid rings, said quadrature hybrid and a third power output means of said quadrature hybrid.

References Cited

UNITED STATES PATENTS 2,895,114   7/1959   Rowen _____ 333—24.1
3,058,049   10/1962  O'Hara et al. _____ 333—24.1 X ELI LIEBERMAN, *Primary Examiner.*

PAUL L. GENSLER, *Assistant Examiner.*

U.S. Cl. X.R.

333—7, 11, 24.3, 84